United States Patent [19]

Olazábal

[11] Patent Number: 4,579,222

[45] Date of Patent: * Apr. 1, 1986

[54] LIGHTER APPARATUS FOR USE WITH CIGARETTE PACKAGES OR CASES THEREFOR

[76] Inventor: Romualdo Olazábal, Box 2926, Bayamon, P.R. 00619

[ * ] Notice: The portion of the term of this patent subsequent to May 31, 2000 has been disclaimed.

[21] Appl. No.: 467,094

[22] Filed: Feb. 16, 1983

Related U.S. Application Data

[63] Continuation of Ser. No. 225,107, Jan. 14, 1981, Pat. No. 4,385,689, which is a continuation of Ser. No. 2,810, Jan. 11, 1979, Pat. No. 4,281,761.

[51] Int. Cl.⁴ .................... A24F 15/10; B65D 85/10
[52] U.S. Cl. .................... 206/87; 206/268; 220/23; 131/329
[58] Field of Search ............ 131/234, 249, 329, 185; 206/85–95, 101, 268; D27/37; 431/253; 220/23

[56] References Cited

U.S. PATENT DOCUMENTS

| | | | |
|---|---|---|---|
| 1,209,759 | 12/1916 | Richter | 206/94 |
| 1,371,731 | 3/1921 | Braden | 206/92 |
| 1,689,479 | 10/1928 | Conklin | 206/94 |
| 1,819,427 | 8/1931 | Maisto | 206/87 |
| 2,043,888 | 6/1936 | Denit | 206/87 |
| 2,460,427 | 2/1949 | Musselman et al. | 206/89 |
| 2,572,863 | 10/1951 | Jaap | 206/86 |
| 2,811,247 | 10/1957 | Stevenson | 206/86 |
| 2,919,018 | 12/1959 | Allen | 206/95 |
| 2,958,416 | 11/1960 | Clark | 206/87 |
| 3,063,552 | 11/1962 | Klein | 206/87 |
| 3,069,886 | 12/1962 | Coats | 431/253 |
| 3,178,016 | 4/1965 | Coats | 206/87 |
| 3,179,891 | 4/1965 | Sharma | 206/87 |
| 3,763,996 | 10/1973 | Shepherd | 206/87 |
| 3,915,295 | 10/1975 | Morrison | 206/86 |
| 4,190,148 | 2/1980 | Schade, II et al. | 206/89 |
| 4,281,761 | 8/1981 | Olazabal | 206/87 |
| 4,385,689 | 5/1983 | Olazabal | 206/87 |

FOREIGN PATENT DOCUMENTS

| | | | |
|---|---|---|---|
| 2518991 | 11/1976 | Fed. Rep. of Germany | 206/92 |
| 1102378 | 11/1955 | France | 206/87 |
| 940610 | 10/1963 | United Kingdom | 206/87 |

Primary Examiner—V. Millin
Assistant Examiner—H. Macey
Attorney, Agent, or Firm—Steinberg & Raskin

[57] ABSTRACT

Improved cigarette lighter apparatus for combined use with cigarette packages of the "flip-top" type or, in one embodiment, with cases for cigarette packages, includes a member for supporting a lighter device, which supporting member is adapted to be removably affixed to a conventional "flip-top" cigarette package in a manner such that upon the contents of the cigarette package being exhausted, the supporting member can be removed therefrom and removably affixed to another conventional cigarette package, and a lighter device mounted on the supporting member. In this embodiment, the supporting member includes a sleeve portion adapted conveniently to fit over a portion of a conventional "flip-top" cigarette package and a lighter supporting cover portion hingedly connected to the sleeve portion. The lighter device may alternately be permanently or removably mounted on the supporting member. In the former case the resulting assembly may be either reusable or disposable while in the latter, the lighter device may be either refillable or disposable by itself. According to a further feature of the invention, the lighter apparatus may alternatively comprise a component of a case for cigarette packages.

Additional embodiments of the invention are disclosed wherever the lighter apparatus may be used either in conjunction with conventional cigarette packages as described above or, alternatively, may be used alone, i.e. not in conjunction with cigarette packages or cases, for lighting cigarettes in the conventional manner.

1 Claim, 10 Drawing Figures

LIGHTER APPARATUS FOR USE WITH CIGARETTE PACKAGES OR CASES THEREFOR

This is a continuation of application Ser. No. 225,107, filed Jan. 14, 1981, now U.S. Pat. No. 4,385,689, which is a continuation of application Ser. No. 2,810 filed Jan. 11, 1979, now U.S. Pat. No. 4,281,761.

BACKGROUND OF THE INVENTION

This invention relates generally to improved cigarette lighter apparatus and, more particularly, to improved lighter apparatus of the disposable or reusable type adapted to be operatively associated in combination with conventional "flip-top" cigarette packages.

All cigarette smokers at one time or another encounter the rather frustrating problem of reaching for a cigarette only to find that he or she has no means by which to light the same. Thus, the smoker may find that he has exhausted his supply of matches or has inadvertently left his mechanical lighter at a location inaccessible to him at the time he wishes to smoke. Even more frustrating and at times more financially debilitating, is the case where the smoker discovers that he has misplaced his mechanical lighter and cannot find the same. In cases where the smoker has acquired a relatively heavy dependence on tobacco, the problem described above becomes acute.

In short, a problem exists for cigarette smokers of having ready access to means for lighting cigarettes. Matches in "book" form do not provide a solution since the supply of matches is readily exhausted. Further, mechanical lighter devices do not solve the problem since it is not uncommon for the smoker to leave the lighter at a location inaccessible at the time at which he desires to smoke. An additional problem in the use of mechanical lighter devices results from the not uncommon occurrence of the smoker inadvertently losing or misplacing the same to his financial detriment.

Various attempts have been made to solve these problems by providing combined cigarette packages and lighter devices. For example, a combined cigarette pack and disposable lighter is disclosed in U.S. Pat. No. 3,976,194 issued Aug. 24, 1976 to Loredo. In the structure, a lighter is incorporated within the interior of specially adapted "flip-top" boxes (as well as in conjunction with "soft" boxes), the lighter having a fuel reservoir large enough to contain fuel sufficient only to service a single pack of cigarettes, so that the lighter device must be discarded with each pack of cigarettes. However, such a combination is not entirely satisfactory since the cigarette package is adapted to be sold with the lighter structure integrally provided thereon and the latter cannot be reused with subsequently purchased conventional cigarette packages. In U.S. Pat. No. 3,069,886 issued Dec. 25, 1962 to Coats, a combination cigarette package and lighter is disclosed wherein a lighter attachment is provided adapted for attachment to a conventional "soft" cigarette package. Although the lighter attachment disclosed in this patent can be reused with subsequently purchased conventional cigarette packages, the apparatus disclosed is disadvantageous in that components thereof necessarily extend into the package requiring removal of at least one cigarette therefrom prior to attachment and use of the structure. Additionally, the structure disclosed in Coats is not amenable for use in connection with conventional "flip-top" boxes.

Further, in general, previous attempts at solving the problems discussed above involve relatively complicated designs which necessarily require a tedious installation involving a modification of the conventional cigarette package or its contents.

Still further, it is desirable to provide a reusable lighter apparatus which not only can be used in combination with cigarette packages of the "flip-top" type, but which have additional advantageous uses. Thus, it is desirable to provide such an improved lighter apparatus for use with cigarette packages and which can additionally be used either by itself in the usual manner, i.e., as a hand-held lighter, or as one component of a case for containing conventional cigarette packages.

SUMMARY OF THE INVENTION

Accordingly, one object of the present invention is to provide a new and improved reusable cigarette lighter apparatus adapted to be removably affixable to conventional "flip-top" cigarette packages so that upon exhausting the supply of cigarettes of one package, the apparatus may be removed therefrom and affixed to a new package.

Another object of the present invention is to provide a new and improved lighter apparatus of the above-described type which permits easy access to the cigarettes contained in the package with which the apparatus is associated.

Still another object of the present invention is to provide a new and improved lighter apparatus of the above-described type wherein the lighter device forming a component thereof is alternatively disposable or reusuable.

Still yet another object of the present invention is to provide a new and improved lighter apparatus of the above-described type which requires no modification of the conventional cigarette package or its contents prior to affixing the apparatus thereto.

Still another object of the present invention is to provide a new and improved lighter apparatus of the above type which may have other additional uses such as a "hand-held" lighter or as one component of a case for containing conventional cigarettes packages.

A further object of the present invention is to provide a new and improved lighter apparatus of the above type which is simple in design and economical in manufacture.

In accordance with one embodiment of the present invention, these and other objects are attained by providing cigarette lighter apparatus including a mechanical lighter device supporting member which is adapted to be removably affixed to a conventional "flip-top" cigarette package in a manner which allows easy access to the cigarettes contained in the package and which may be removed therefrom and removably affixed to another conventional "flip-top" cigarette package upon the contents of the first package being exhausted. The supporting member includes a sleeve portion adapted to fit snugly over a portion of a "flip-top" cigarette package and a cover portion hingedly connected thereto for supporting the lighter device. A mechanical lighter device is mounted on the supporting cover portion which may alternatively be permanently or removably affixed thereto. The mechanical lighter device may alternatively be either disposable or refillable. In this particular embodiment, the supporting cover portion is hingedly connected to the sleeve portion in a manner such that upon opening the conventional "flip-top"

cigarette package, the supporting cover portion will be simultaneously pivotally opened to permit easy access to the cigarettes contained within the package.

The embodiment of the lighter apparatus described above is easily adapted for use as one component of a case for housing conventional cigarette packages, either of the "flip-top" or "soft" types, or both. In this case, the sleeve portion of the lighter apparatus is adapted to cooperate with a receptacle component of the case in a telescoping manner to define the case as a whole. Means are preferably provided whereby the lighter apparatus and receptacle can be selectively axially located with respect to each other at one of a plurality of positions to accommodate various different lengths of cigarettes.

The lighter apparatus may be disposable as a unit separate from the receptacle component or, alternatively, the entire case may be disposable or reusable. Further, the lighter device alone may be of the disposable type or may be refillable.

Further, lighter apparatus according to the present invention are disclosed which are adapted to be removably affixed to conventional "flip-top" cigarette packages, but which may alternatively function as conventional "hand-held" lighters, i.e., the lighter apparatus may be advantageously utilized separate and apart from a cigarette package.

DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein:

FIGS. 8A and B are perspective views of still yet another embodiment of the lighter apparatus of the present invention.

DESCRIPTION OF THE PREFERRED EMBODIMENTS

Referring now to the drawings wherein like reference characters designate identical or corresponding parts throughout the several views and, more particularly, to FIGS. 1 and 3 through 5, one embodiment of the cigarette lighter apparatus of the present invention, generally denoted as 10 (FIG. 1), is illustrated and generally comprises a supporting member 12 on which a mechanical lighter device 14 is secured by members 16 in a manner discussed in detail below. It is understood that the particular construction of the lighter device 14, apart from the means provided for mounting the same on the supporting member 12, comprises no part of the present invention and any lighter device of conventional construction may be utilized in connection with the present invention. Thus, as described below, the lighter device 14 may be of the disposable or reusable type and may be fueled by lighter fluid or butane or the like.

The supporting member 12 is constructed so as to be removably affixable to a conventional "flip-top" cigarette package in a manner such that upon the supply of cigarettes contained within the package being exhausted, the supporting member can be removed therefrom so that it may be in turn removably affixed to a fresh cigarette package. Supporting member 12 may be constructed of plastic, metallic or any other suitable material which can be appropriately formed in a manner discussed below.

Supporting member 12 is defined by a lower sleeve portion 18 constructed so as to fit over the portion of a conventional "flip-top" cigarette package 20 located immediately below the hinged cover portion thereof and an upper lighter supporting cover portion 28 adapted to fit over the cover of the box 20. Thus, sleeve portion 18 is itself defined by front and rear wall portions 22, 24 and a pair of side wall portions 26 (one shown), which together define a substantially rectangular transverse cross-section having dimensions such that cigarette package 20 is snugly receivable therewithin. The lighter supporting cover portion 28 is defined by front and rear wall portions 30, 32 and a pair of side wall portions 34 (one shown) and which preferably have substantially the same cross-sectional dimensions as sleeve portion 18.

As will be described below, supporting cover portion 28 is operatively connected to sleeve portion 18 thereby defining supporting member 12 as a unitary member.

Figures 1, 2:
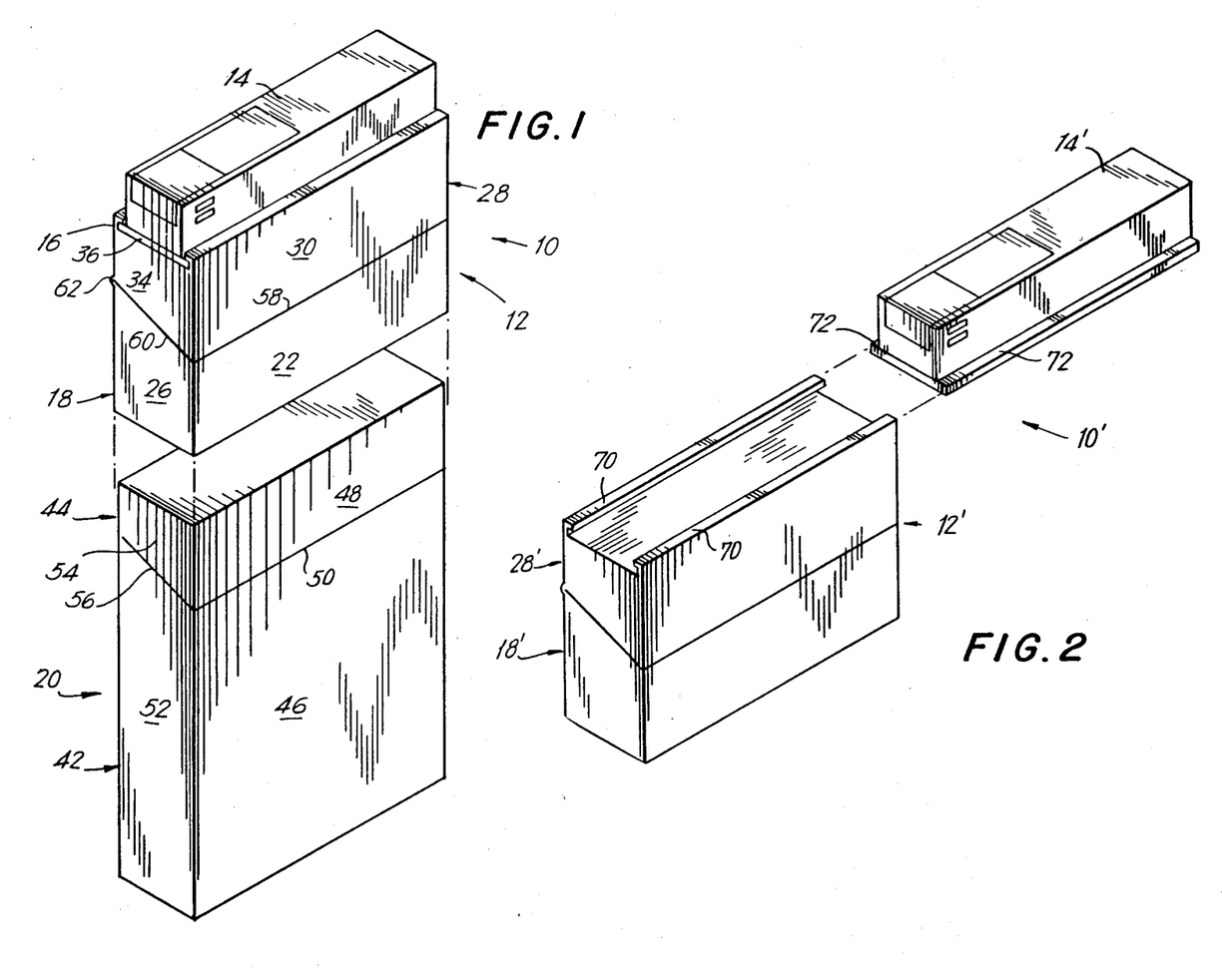
FIG. 1 is a perspective view of one embodiment of the cigarette lighter apparatus of the present invention comprising a supporting member and a permanently affixed lighter device and further illustrating the manner in which it is operatively associated with a conventional "flip-top" cigarette package.
FIG. 2 is a perspective view of another embodiment of the lighter apparatus of the present invention comprising a supporting member and a removable lighter device.
Figure 3:
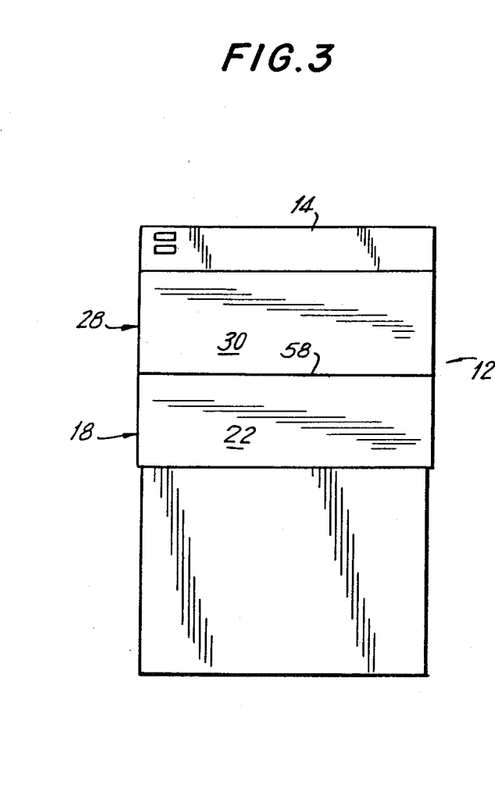
FIG. 3 is a front elevation view of the cigarette lighter apparatus of the present invention according to the embodiments of FIGS. 1 and 2 operatively associated with a conventional "flip-top" cigarette package.
Figure 5:
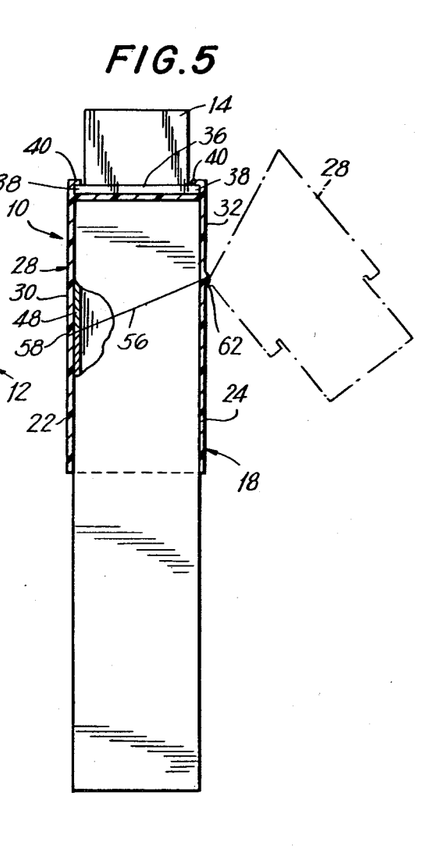
FIG. 5 is a section view taken along line 5—5 of FIG. 4 and further illustrating in dash-dot lines the cigarette lighter apparatus of the present invention upon opening the cigarette package.

The mechanical lighter device 14, in the embodiment illustrated in FIG. 1, is permanently affixed to the top of the supporting cover portion 28 of supporting member 12 in the manner illustrated in FIGS. 1 and 5. Thus, in the presently illustrated embodiment, the longitudinal edges of base 36 of lighter device 14 extend laterally beyond the longitudinally extending side surfaces thereof to define a pair of projecting tongues 38 (FIG. 5). A pair of longitudinally extending groove defining bead portions 40, preferably integrally formed with cover portion 28, overlappingly engage tongues 38 and are resiliently biased thereagainst so that the tongues are permanently captured within the grooves defined thereby. In this manner, lighter device 14 is permanently affixed to supporting member 12. Of course, it is understood that the present invention is not limited to this particular structure for mounting the lighter device 14 to the supporting member 12.

The above-described embodiment of the cigarette lighter apparatus 10 is particularly adapted for use in conjunction with a conventional cigarette package of the "flip-top" type. Thus, referring to FIG. 1, a conventional cigarette package 20 comprises a lower package portion 42 and an upper hinged cover portion 44. The front surfaces 46, 48 of the package and cover portions 42, 44, respectively, have upper and lower transversely extending, rectilinear edges which meet along a line 50 when the package 20 is closed. In a similar manner, each pair of side surfaces 52, 54 of the package and cover portions 42, 44, respectively, have upper and lower obliquely extending rectilinear edges which meet along a line 56 (one shown) when the package 20 is closed. The package and cover portions 42, 44 of the cigarette package are hinged together along mating upper and lower edges of the rear surfaces of the package and cover portions, respectively. Although this hinge connection is not seen in FIG. 1, it is well known that the conventional construction of such cigarette packages is such that the horizontal plane containing the cover hinge line is located somewhat above the horizontal plane containing the line 50 defined by the mating upper and lower edges of the front surfaces 46, 48 of the package and cover portions 42, 44.

Figure 4:
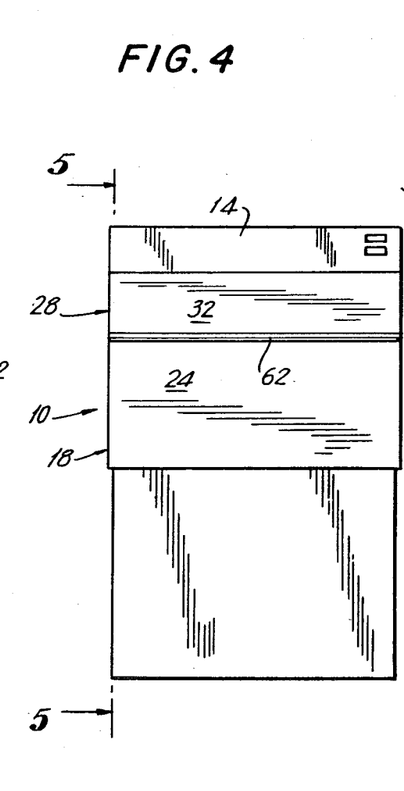
FIG. 4 is a rear elevation view of the cigarette lighter apparatus illustrated in FIG. 3 operatively associated with a conventional "flip-top" cigarette package.

In the embodiment of the lighter apparatus 10 illustrated in FIG. 1, the supporting member 12 includes the upper supporting cover portion 28, which is suitably configured and dimensioned so as to snugly receive and substantially precisely overlie the cover portion 44 of cigarette package 20. In this manner, the sleeve portion 18 will overlie the package portion 42 of package 20 in the region immediately below cover portion 44. Thus, the front wall portions 22, 30 of the sleeve and supporting cover portions 18, 28 of supporting member 12 have upper and lower transversely extending rectilinear edges which matingly engage when in their closed configuration along a line 58. Similarly, the upper and lower edges of side portions 26, 34 of sleeve and supporting cover portions 18, 28 extend in an oblique manner and matingly engage each other along rectilinear lines 60 (one shown). Referring to FIG. 4, the upper and lower edges of rear wall portions 24, 32 of sleeve and supporting cover portions 18, 28 are interconnected by a transversely extending, rectilinear hinge portion 62 which is preferably integrally formed with the sleeve and supporting cover portions 18, 28.

As mentioned above, the dimensions of the supporting cover portion 28 of lighter apparatus 10 are provided to closely correspond with the dimensions of the cover portion 44 of cigarette package 20, with the former being slightly larger so as to be capable of snugly receiving the same therewithin. Thus, the front wall portion 30 of cover portion 28 corresponds in dimensions to the front surface 48 of cigarette package cover portion 44 and, in like manner, the side and rear surfaces 34, 32 of supporting cover portion 28 correspond in dimensions to the side and rear surfaces of the cigarette package cover portion 44.

As clearly seen in the Figures, the cross-sectional dimensions of the sleeve portion 18 of supporting member 12 corresponds to the dimensions of a cross-section of package portion 42 of cigarette package 20 so that the latter is snugly received in the former. However, the vertical dimensions of sleeve portion 18 are somewhat arbitrary and need only be sufficiently large so that the sleeve portion 18 will adequately support the cover portion 28 when the cigarette package is opened as described below.

Thus, upon affixing the cigarette lighter apparatus 10 to the conventional "flip-top" cigarette package 20, as best seen in FIG. 5, the package cover portion 44 snugly fits within the interior space defined within supporting cover portion 28 so that the front wall portion 30 of the latter overlies the front surface 48 of the former. In a similar manner, the remaining wall portions 32, 34, which define the supporting cover portion 28, overlie the corresponding surfaces defining the cigarette package cover portion 44. The sleeve portion 18 extends downwardly over and snugly receives an upper section of the package portion 42 of cigarette package 20. Importantly, the front and side mating edges of the sleeve and supporting cover portions 18, 28, defined by lines 58, 60, are substantially aligned over the respective front and side mating edges of the package and cover portions 42, 44 of the cigarette package 20, defined by lines 50, 56. Hinge portion 62 of supporting member 12 is substantially aligned with the hinge portion of the cigarette package.

After fixing the cigarette lighting apparatus 10 on cigarette package 20, when it is desired to smoke a cigarette, it is only necessary to pivot supporting cover portion 28 on hinge portion 62 as shown in phantom in FIG. 5, which, in turn, causes cover portion 44 of cigarette package 20, which is captured within supporting cover portion 28, to pivot on its own hinge portion, to thereby open cigarette package 20 to provide access to its interior. After withdrawing a cigarette, the above steps are reversed to close the package. The lighter device 14 is then operated to light the cigarette.

As mentioned above, in the present embodiment, lighter device 14 is permanently affixed to supporting member 12 through mounting apparatus 16 comprising a tongue and groove assembly. In this embodiment, the cigarette lighter apparatus 10 comprises a unitary assembly, the assembly being either disposable whereupon the combined lighter device and supporting member are discarded after the lighter device 14 runs out of fuel, or is reusable. In its reusable embodiment, the lighter device 14 is provided with a refueling port at an easily accessible location thereon.

After the cigarette supply in package 20 is exhausted, it is an easy matter to remove the cigarette lighting apparatus from package 20 and affix it to a fresh cigarette package. It is thus seen that lighter apparatus 10 is reusable and can be associated with a great number of cigarette packages.

Referring to FIG. 2, another embodiment of the cigarette lighter apparatus of the present invention is shown, parts thereof which correspond to similar parts of the embodiment illustrated in FIG. 1 being denoted by the same numeral, primed.

Thus, cigarette ligher apparatus 10' comprises a supporting member 12' which includes a sleeve portion 18' and a lighter supporting cover portion 28' hingedly mounted thereto. The sleeve and lighter supporting portions have the same general configuration as the corresponding structure described above in connection with the embodiment of FIG. 1. However, in the present embodiment, the lighter device 14' is affixable to the supporting cover portion 28' in a removable manner. Thus, flanges 70 extend inwardly from the sides of the top of supporting cover portion 28' to define grooves which are receivable of longitudinally extending tongue portions 72 provided on lighter device 14'. The tongue and groove arrangement is designed to provide a friction fit so that although the lighter device 14' is removable from lighter supporting portion 28', it is firmly held thereon upon the tongue portions 72 being fitted within the grooves defined by flanges 70.

In this embodiment, the supporting member 12' is reusable while the lighter device 14' may be either disposable or refillable. Thus, the supporting member 12' may be purchased alone or in combination with a lighter device 14'. Further, referring to FIG. 2, it is seen that lighter device 14' may be utilized by itself as a conventional hand-held lighter. Thus, it is possible to separate lighter device 14' from the supporting member 12' so that it may be used as a conventional lighter, i.e., not in association with a package of cigarettes or the like.

Thus, a cigarette lighting apparatus is provided according to the present invention which is removably affixable to conventional "flip-top" cigarette packages and which permits easy access to the package with which it is associated. The apparatus may be formed with the lighter device permanently affixed to the supporting member in which case the entire assembly may be either disposable or reusable. Alternatively, the lighter device may be removably affixed to the supporting member in which case the lighter device itself may be alternately disposable or refillable with the supporting member being reusable in any event. It is apparent that the apparatus of the present invention is simple in design and economical in manufacture.

Furthermore, the improved design of the above-described embodiments of the lighter apparatus of the present invention permits a quick and easy affixation of the lighter apparatus to the conventional cigarette package and, similarly, allows for a quick and easy removal thereform after the cigarette supply of the package is exhausted. It is also seen that affixation of the lighter apparatus requires no modification of the conventional cigarette package or its contents thereby greatly simplifying the association of the lighter apparatus with the conventional "flip-top" cigarette package.

Figure 6:
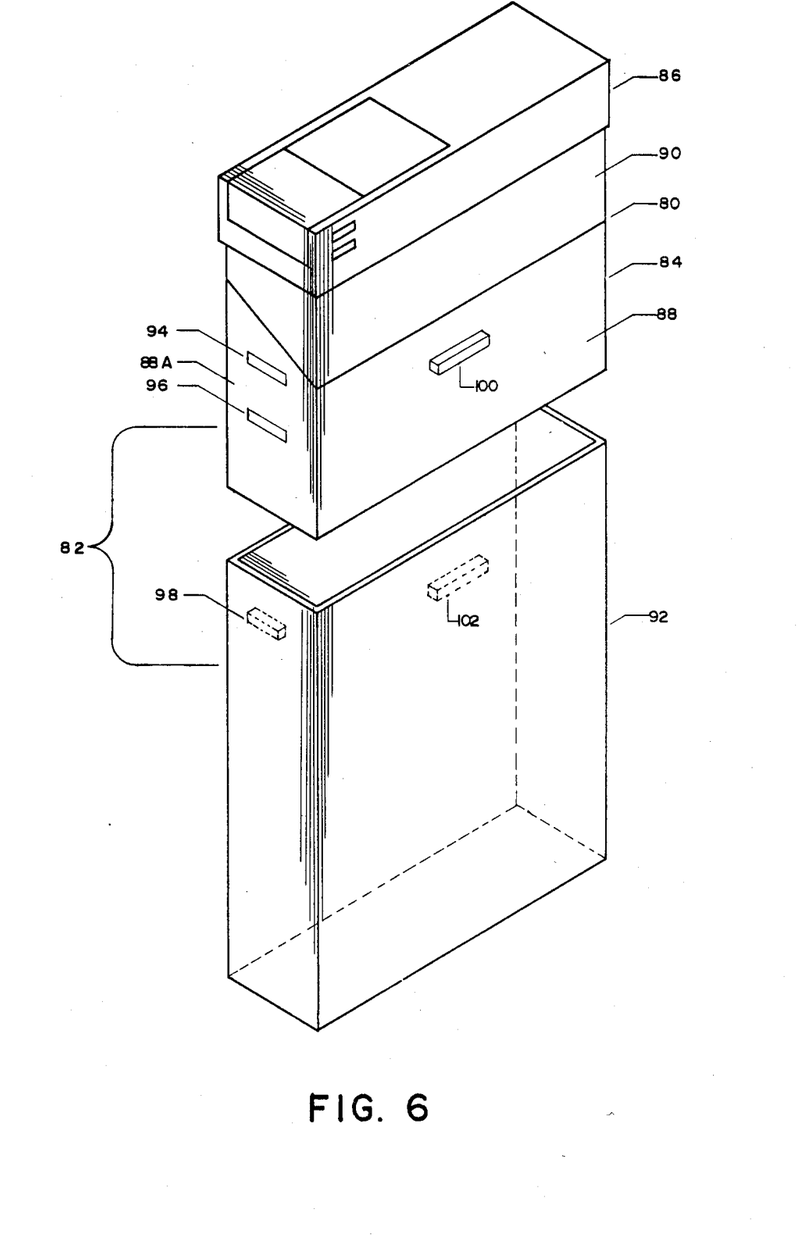
FIG. 6 is a perspective view of another embodiment of the lighter apparatus of the present invention further illustrating its additional use as a component of a case for cigarette packages.

Referring now to FIG. 6, another embodiment of the lighter apparatus of the present invention, designated 80, is illustrated, which is adapted for use both in association with the conventional "flip-top" cigarette package as described above in connection with FIGS. 1-5, and additionally, is adapted to function as one component of a cigarette case, designated 82. Thus, lighter apparatus 80 comprises a supporting member 84 and a lighter device 86 mounted thereon, either permanently or removably as described above in connection with the embodiment of FIGS. 1 and 2. Supporting member 84 comprises a sleeve portion 88 and lighter supporting cover portion 90 hinged thereto by a rectilinearly extending hinge portion (not shown). Thus, in the above respects, lighter apparatus 80 has substantially the same configuration and dimensions as lighter apparatus 10, 10' and is adapted to fit over the top of a conventional "flip-top" cigarette package in the same manner as described above.

However, as previously mentioned, lighter apparatus 80 has the additional use as one component of a cigarette case 82 adapted to receive an entire cigarette package. In this connection, lighter apparatus 80 is adapted to be telescopingly received into the open end of a lower receptacle portion 92. Thus, receptacle portion 92 is a rectangular parallelepiped having cross-sectional dimensions sufficiently large so as to be receivable of a conventional cigarette package while still providing sufficient space for the walls of the sleeve portion 88 of lighter apparatus 80 to be received between the cigarette package and the side walls defining receptacle portion 92 after location of the cigarette package within receptacle portion 92.

Upper and lower vertically aligned transverse slots 94, 96 are provided in the side wall 88a of sleeve portion 88 and an inwardly extending complimentary shoulder is provided on one side wall of receptacle portion 92, shoulder 98 being appropriately dimensioned and positioned so as to be receivable in either of slots 94, 96, upon inserting lighter apparatus 80 into receptacle portion 92. Additionally, the transverse shoulder 100 is provided on front wall 88b of sleeve portion 88 while a similar inwardly extending transverse shoulder 102 is provided on the corresponding wall of receptacle portion 92 in a position so as to be engagable with shoulder 100 upon inserting lighter apparatus 80 into receptacle portion 92.

In one mode of operation, a conventional cigarette package is inserted into the receptacle portion 92 whereupon the lighter apparatus 80 is then telescopingly inserted into receptacle portion 92 over the upper end of the cigarette package. The sleeve and receptacle portions 88, 92 are sufficiently flexible so that the lighter apparatus 80 is inserted until the shoulder 100 (normally in engaging relationship with shoulder 102) by-passes shoulder 102 moving below the same, the respective portions being flexed during insertion to permit such movement. Depending upon whether the cigarette package inserted in receptacle 92 contains regular or "king-size" cigarettes, the lighter apparatus 80 is continuously inserted until shoulder 98 fits within one of the slots 94, 96. Thus, if the cigarette package contains regular cigarettes, lighter apparatus 80 is inserted until shoulder 98 enters upper slot 94. If the package contains "king-size" cigarettes, shoulder 98 is inserted into lower slot 96. In the movement of the lighter apparatus between the two positions, it is only necessary to apply pressure to the side wall 88a of sleeve portion 88 to disengage the shoulder 98 from one of the slots, move the lighter apparatus to a desired position, and release the pressure to allow engagement. The shoulders 100, 102 prevent the lighter apparatus 80 from inadvertently separating from receptacle portion 92 although, of course, the two members may be separated when desired by applying pressure to the front wall of the sleeve portion 88.

In another mode of operation, the components of cigarette case 82, namely lighter apparatus 80 and receptacle portion 92, are initially interconnected as described above with the shoulder 98 being received within the appropriate one of the slots 94, 96, depending upon whether the case will house a pack of "king-size" or "regular" cigarettes. The cigarette pack is introduced within case 82 by merely pivotally opening the hinged cover portion 90 and inserting the pack into the case through the opening provided therein. Upon the contents of the pack being exhausted, the pack is removed from the case in the same manner, i.e., by opening cover portion 90 and withdrawing the pack from the case. In this manner, it is not necessary to separate the lighter apparatus 80 from the receptacle portion 92.

It should also be noted that the lighter apparatus 80 may be disposable or reusable and, similarly, the lighter device 86 may be disposable or refillable. This of course follows from the fact that lighter apparatus 80 essentially comprises the lighter apparatus 10 of the FIG. 1 embodiment of the present invention, slightly modified as described above. Further, the entire cigarette case 82 may be adapted to be disposable as an entire unit or to be reusable.

Thus, it is seen that a lighter apparatus 80 is provided which has dual interchangeable uses, mainly for removable attachment to a conventional "flip-top" cigarette package as discussed above in connection with the embodiments of FIGS. 1 and 2, and as a component of a telescoping cigarette case adapted to hold cigarette packages of either regular or "king-size" cigarettes. Of course, it should be understood that the lighter apparatus may be provided without the slot and shoulder features illustrated in FIG. 6 and still retain the dual functions, described above.

Figure 7A:
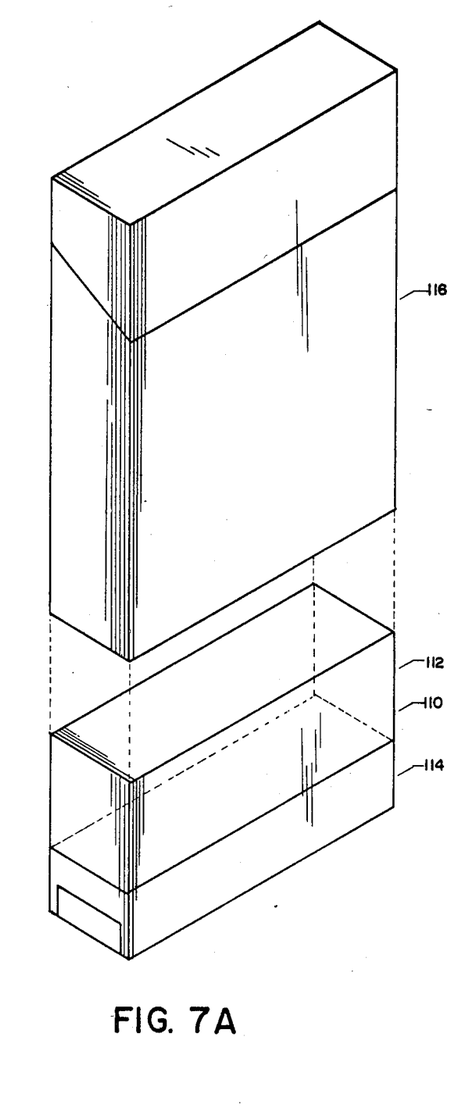
FIGS. 7A and B are perspective views of yet another embodiment of the lighter apparatus of the present invention.
Figure 7B:
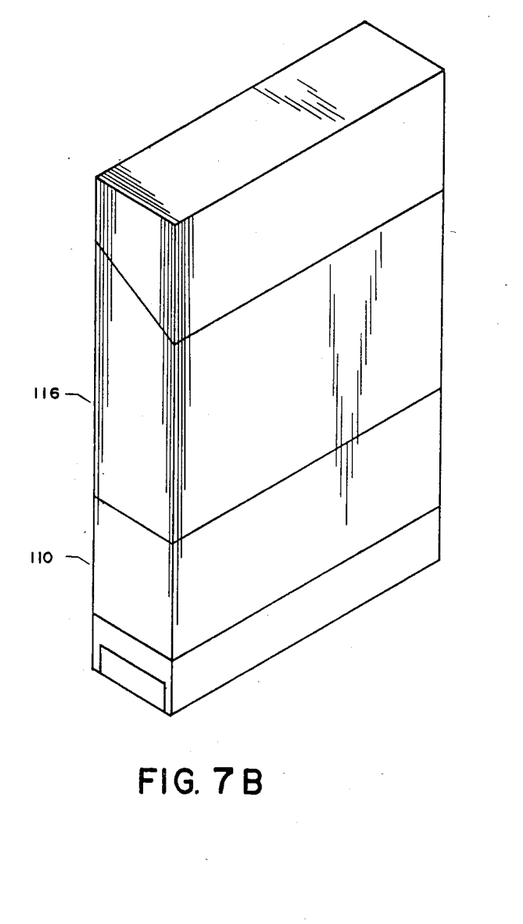

Referring now to FIGS. 7A and B, still another embodiment of the present invention is illustrated comprising a lighter apparatus 110 constructed in the same manner as the lighter apparatus 10 of FIG. 1 but without the hinged lighter device supporting cover portion. Thus, lighter apparatus 110 comprises a sleeve portion 112 to which a lighter device 114 is affixed, either permanently or removably, preferably in the same manner as the lighter device 14 is connected to cover portion 28 in the embodiment of FIG. 1, although it is understood that this connection may be accomplished in any conventional manner. As is evident from the Figures, sleeve portion 112 comprises a four sided member appropriately dimensioned so as to receive in a snug fitting manner the lower end of a cigarette package 116. In other words, lighter apparatus 110 is removably affixed to cigarette package 116 by inserting the lower end of the latter into the open end of sleeve portion 112, moving cigarette package 116 downwardly until its bottom wall substantially abuts the bottom wall of sleeve portion 112 which may comprise the base of lighter device 114. As in the case of the previously described embodiments, a lighter apparatus 110 is thus provided which is simple in construction and easy to affix to a conventional cigarette package and which requires no modifications of the package or its contents in such association.

Figures 8A, 8B:
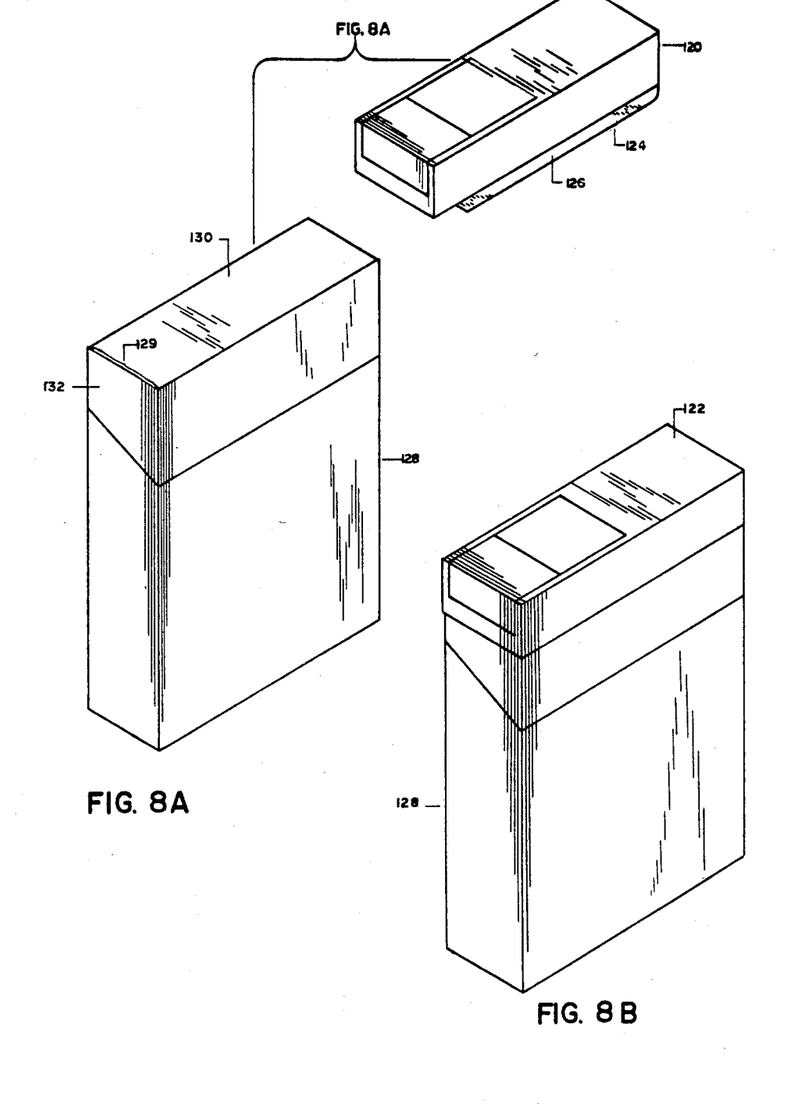

Finally, referring to FIG. 8, another embodiment of lighter apparatus according to the present invention, designated 120, is illustrated. Lighter apparatus 120 includes a lighter device 122 and a clip-type supporting member 124 which, in the present embodiment, comprises a clip member 126 longitudinally extending in a substantially parallel manner to the base of the lighter device 122 being spaced therefrom defining at least a slight clearance therebetween. Clip member 126 is affixed to one end of the lighter device base as seen in FIG. 8A. The lighter apparatus 120 is affixed to a conventional "flip-top" cigarette package 128 through one of the two openings 129 (only one shown) conventionally defined between the top wall 130 of the cigarette package cover portion, the upwardly extending side walls 132 and the horizontally extending inner flaps (not shown) defined by folded extensions of side walls 132 which underlie top wall 130. Thus, the clip member 126 is inserted into one of the openings 129 with the top wall 130 being disposed within the clearance defined between the clip member and the base of the lighter device. The clip member may be resiliently biased against the lighter device base so as to effect a positive clipping pressure on the top wall 130. Lighter device 122 may be of the disposable or refillable type.

Thus, a lighter apparatus is provided which requires no modification of the cigarette package to which it is removably affixed and which is simple in design.

In connection with the embodiment of the invention illustrated in FIG. 8, the entire lighter apparatus 120 may be used in its entirety as a "hand-held" lighter. More particularly, since the supporting member 124 comprising clip member 126 is relatively compact and not bulky, the entire lighter apparatus 120 may be used as a hand-held lighter. Of course, supporting member 124 may have any one of a number of configurations within the scope of the present invention.

In summary, a lighter apparatus is provided according to the present invention which essentially comprises a lighter device mounted to a supporting member which is removably affixable to a conventional "flip-top" cigarette package in a manner such that no modification need be made to the box or to its contents. The apparatus is easily removed from an exhausted pack and subsequently reaffixed to a fresh pack. The mechanical lighter device forming a part of the apparatus may be of the disposable or refillable type and may be an integral part of the apparatus or, alternatively, a removable component thereof. Of course, when the lighter device is disposable and is an integral part of the lighter apparatus, the entire apparatus will be disposable after the fuel supply is exhausted. According to features of certain embodiments of the invention, the lighter apparatus has dual functions, namely, as in attachment to conventional "flip-top" boxes as described above as well as constituting a component of a cigarette case for containing cigarette packages. Further, the lighter apparatus itself, in certain embodiments, may function as a "hand-held" lighter.

Obviously, numerous modifications and variations of the present invention are possible in the light of the above teachings. It is therefore understood that within the scope of the appended claims the invention may be practiced otherwise as specifically disclosed herein.

What is claimed is:

1. Apparatus for removably positioning a mechanical lighter device on a conventional flip-top cigarette package having a flip-top cover portion and a bottom end portion at the end of the package opposite from said flip-top cover portion comprising;

a mechanical lighter device;

means for supporting said mechanical lighter device to which said mechanical lighter device is attached; and wherein said mechanical lighter device supporting means to which said mechanical lighter device is attached includes means for removably positioning said mechanical lighter device directly over the exterior of said bottom end portion of a conventional flip-top cigarette package with no modification of any package component or to the interior space available for cigarettes within the package being required upon such positioning and such that the flip-top cover portion can be opened and closed to provide access to the interior space within the package while said mechanical lighter device remains continuously supported by said supporting means such that by said mechanical lighter device supported by said supporting means, a cigarette can be lit.

* * * * *